Figure 1:
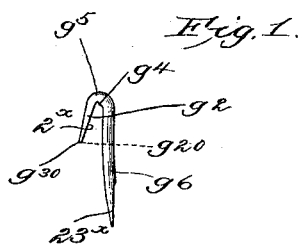

No. 669,025.  
L. A. CASGRAIN.  
METALLIC FASTENING.  
(Application filed Jan. 23, 1901.)  
Patented Feb. 26, 1901.

(No Model.)

Witnesses.

Inventor:
Louis A. Casgrain,
by Crosby Gregory
atty's.

UNITED STATES PATENT OFFICE.

LOUIS A. CASGRAIN, OF WINCHESTER, MASSACHUSETTS, ASSIGNOR TO UNITED SHOE MACHINERY COMPANY, OF BOSTON, MASSACHUSETTS.

METALLIC FASTENING.

SPECIFICATION forming part of Letters Patent No. 669,025, dated February 26, 1901.

Original application filed May 25, 1900, Serial No. 17,938. Divided and this application filed January 23, 1901. Serial No. 44,376. (No model.)

*To all whom it may concern:*

Be it known that I, LOUIS A. CASGRAIN, a citizen of the United States, residing at Winchester, in the county of Middlesex and State of Massachusetts, have invented an Improvement in Metallic Fastenings, of which the following description, in connection with the accompanying drawings, is a specification, like reference characters on the drawings representing like parts.

This invention consists in a fastening having a shank or body and a head with a downturned portion or depending point, constituting a hook-shaped end for the fastening. The fastening is preferably composed of wire, and the hook-shaped head is formed by bending the wire.

The method of forming this fastening is described and claimed in an application for United States Letters Patent, Serial No. 17,938, filed May 25, 1900, of which application this present application is a division.

Figure 2:
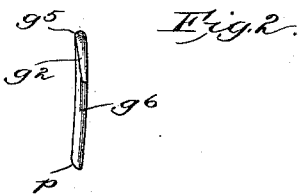
Figure 3:
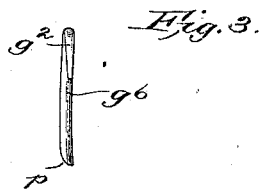
Figure 4:
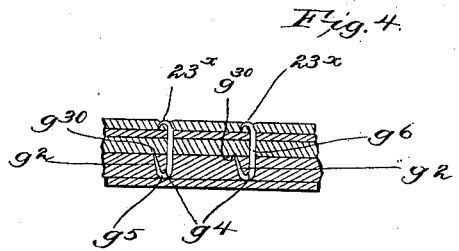

In the drawings, Figure 1 is a view of the fastening, showing the hook-shaped head with the curved shank and the long tapered point. Fig. 2 is a view of the fastening, taken in the plane of the shank and depending point of the head and shows the shank curved away from the plane of the head. Fig. 3 is a similar view showing the shank curved in the opposite direction. Fig. 4 shows the fastenings as they appear when set or inserted in the stock.

Referring to the drawings, $g^6$ is the shank of the fastening, which is preferably formed with a long tapered clenching-point $23^\times$. The head $g^5$ is preferably curved sharply and has a downturned portion or depending point $g^2$, which is preferably tapered at $2^\times$ like the point of the shank. I find it advisable to begin the taper on the depending point of the head at such a point $g^4$ as to leave for a portion of the head the full diameter and strength of the wire in order that the head may have sufficient strength to withstand the blow of the driver when the fastening is inserted by a machine. The shank $g^6$ of the fastening is preferably curved away from the depending head $g^2$, as is shown in Fig. 1. This curve is utilized to control the direction of movement of the shank of the fastening as it is being driven through the stock. If the shank or body of the fastening, formed as herein described, were straight, it would be difficult or impossible to drive the fastening straight into the stock, since owing to the shape of the head the shank would curve or bend toward the depending point of the head while the fastening was being driven. Preferably the taper on the point of the shank of the fastening is formed, as shown at $23^\times$, on the side of the shank opposite the depending point, so that when the fastening is driven the point of the shank will be clenched or turned back into the stock toward the depending point of the head, as shown in Fig. 4, on the same side of the shank as the depending point of the head. As a result of forming the fastening in this way the fastening when driven is given what may be called a "double clench"—that is, the point of the shank is clenched and turned upward toward the depending point of the head, which is driven into the stock on the opposite side of the stock, so that both head and point are clenched and all movement of the fastening in either direction is prevented. When the fastening is in the stock, it consists, therefore, of a single strand of wire passing through the stock, having hook-shaped ends engaging and embedded in each side of the stock. An extensive and rapidly-increasing commercial use is demonstrating the great value of this fastening, particularly in the manufacture of boots and shoes. By means of the hook-shaped ends I am able to secure a great holding power, while owing to the single strand of wire connecting the hook-shaped ends there is less interference with the flexibility of the material than is the case with any other form of metallic fastening hitherto used.

The driving of a fastening having a hook-shaped head straight into the stock is a problem of considerable difficulty. To insure proper driving of my fastening I prefer to form the hook-shaped head so that the greatest width of the fastening shall be in the horizontal section in which is the tip $g^{30}$ of the depending point $g^2$. This section is indicated by dotted lines $g^{20}$ in Fig. 1. When the fastening thus formed is driven, the driver-passage will be formed slightly narrower than the width of the fastening at $g^{20}$, and the tip $g^{30}$ of depending point $g^2$ will be sprung slightly toward the shank $g^6$. This compression of the fastening will result in holding the shank $g^6$ firmly against its side of the driver-passage throughout the driving of the fastening.

The fastening is preferably formed with a bevel on one side of the tapered point, as shown at $p$, Figs. 2 and 3. In one use for which this fastening is especially intended—that is, the attaching of the outer soles of boots or shoes—the fastening will generally be driven so that the plane in which the shank and the depending point of the head lie will be substantially parallel to the edge of the sole. When the fastening is so used, it is desirable that the bevel be on that side of the fastening which is nearer the edge of the sole, for the bevel then causes the point of the fastening to incline slightly away from the edge of the sole as the fastening is driven, and it is thereby insured that the fastening will not be driven in such a direction that the point will enter the upper.

Sometimes when the fastening is used in attaching the soles of shoes it has to be driven into the outer sole closer to the edge of the sole than usual—as, for example, when the sole is of inferior quality—and in such case it is desirable to drive the fastening at a greater inclination than is imparted by the bevel. To secure this additional inclination I curve the wire, as shown in Fig. 2, in a plane at substantially a right angle to the plane of the depending point of the head and the shank.

In case it should be desired to drive the fastening substantially straight into the stock, I may curve the wire in an opposite direction, as shown in Fig. 3, so that the beveled point and curve together result in the driving of the shank of the fastening straight into the stock. In this way I can compensate, if desired, for the inclination given to the fastening by beveling the edge of the tapered point, so that the fastening will be driven straight, or I can cause it to be driven at a greater inclination than that caused by the bevel, or I can cause it to be driven at an opposite inclination.

Having described my invention, what I claim, and desire to secure by Letters Patent, is—

1. A shoe-fastening composed of wire presenting a curved shank or body with a clenching-point and a head having a depending point shorter than the shank.

2. A fastening composed of a shank or body and a head having a depending point shorter than the shank, the shank being curved away from the depending point of the head.

3. A shoe-fastening having a head with a depending point and having its shank or body provided with a double curvature.

4. A shoe-fastening having its shank or body provided with a double curvature and having a hook-shaped head shorter than the shank.

5. A shoe-fastening having a narrow head with a depending point and having a curved shank or body with a point tapered on the side of the shank opposite the depending point of the head, the depending point of the head being shorter than the shank.

6. A fastening having a curved shank or body with a tapered point and with a bevel formed on one edge of the tapered point and having a head with a depending point.

7. A shoe-fastening formed of wire and having a curved shank or body and a head with a depending point shorter than the shank, the greatest width of the fastening being at the tip of the depending point.

8. A shoe-fastening having a curved shank or body and a head with a depending tapered point shorter than the shank, a portion of the head being formed with the full diameter of the wire, thus affording sufficient strength for the head when the fastening is being driven.

9. A fastening formed from wire and having a curved shank or body and a narrow hook-shaped head with a tapered depending point shorter than the shank, the shank having a taper formed on the side of the point opposite the hook-shaped head.

10. A fastening formed from wire having a narrow hook-shaped head and having a shank or body curved away from the hook-shaped head and also curved in a plane substantially at a right angle to the plane of the hook-shaped head.

11. A shoe-fastening formed from wire having a head provided with a depending point shorter than the shank, and a shank having its end cut away at one side only to facilitate the turning back of the same when inserted into leather.

12. A shoe-fastening formed from wire and having a hook-shaped head provided with a depending point, and a shank with a point having a flat taper on one side only, the depending point of the head being shorter than the shank, whereby the fastening when driven into leather may have the point depending from the head inserted into one side of the stock and the tapered point of the shank turned back into the other side of the stock, forming in the stock a fastening having hook-shaped ends united by a single strand of wire.

In testimony whereof I have signed my name to this specification in the presence of two subscribing witnesses.

LOUIS A. CASGRAIN.

Witnesses:
  GEO. W. GREGORY,
  NELSON W. HOWARD.